(12) United States Patent
Crimmins et al.

(10) Patent No.: US 10,430,620 B2
(45) Date of Patent: Oct. 1, 2019

(54) DYNAMIC THERMOELECTRIC IMAGE BRANDING

(71) Applicant: International Business Machines Corporation, Armonk, NY (US)

(72) Inventors: Andrew G. Crimmins, Montrose, NY (US); Pasquale A. Catalano, Wallkill, NY (US); John S. Werner, Fishkill, NY (US); Arkadiy O. Tsfasman, Wappingers Falls, NY (US); Michael J. Ellsworth, Jr., Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/904,602

(22) Filed: Feb. 26, 2018

(65) Prior Publication Data

US 2019/0266362 A1    Aug. 29, 2019

(51) Int. Cl.
*G06K 19/06*        (2006.01)
*G06K 1/12*         (2006.01)

(52) U.S. Cl.
CPC ................... *G06K 1/126* (2013.01)

(58) Field of Classification Search
USPC ........................................................ 235/494
See application file for complete search history.

(56) References Cited

U.S. PATENT DOCUMENTS

| | | |
|---|---|---|
| 3,496,333 A | 2/1970 | Alexander et al. |
| 3,726,212 A | 4/1973 | Combs |
| 4,250,511 A | 2/1981 | Stein et al. |
| 6,323,467 B1 | 11/2001 | Alsafadi |
| 7,199,333 B2 | 4/2007 | Alphandary |
| 7,229,025 B2 | 6/2007 | Sussmeier et al. |
| 9,253,963 B2 | 2/2016 | Mays et al. |
| 2003/0121906 A1 | 7/2003 | Abbott et al. |

(Continued)

FOREIGN PATENT DOCUMENTS

| CN | 202378429 U | 8/2012 |
|---|---|---|
| DE | 2855981 A1 | 7/1979 |

(Continued)

OTHER PUBLICATIONS

List of IBM Patents or Patent Applications Treated as Related; (Appendix P), Filed Feb. 26, 2018; 2 pages.

(Continued)

*Primary Examiner* — Ahshik Kim
(74) *Attorney, Agent, or Firm* — Cantor Colburn LLP; Tihon Poltavets

(57) ABSTRACT

A method, computer program product, and image branding system brand an image on a product. The system includes an image controller to determine current values for application to one or more thermoelectric devices. The image controller also determines a current range within which to select the current values based on a material composition of the product. The system also includes an image branding device including the thermoelectric devices. Each of the thermoelectric devices have a corresponding contact surface representing a single pixel. The contact surface of each of the one or more thermoelectric devices is heated based on the respective current value applied.

20 Claims, 11 Drawing Sheets

(56) References Cited

U.S. PATENT DOCUMENTS

| | | | |
|---|---|---|---|
| 2005/0045702 A1 | 3/2005 | Freeman et al. | |
| 2007/0225162 A1* | 9/2007 | Kawahara | B41J 2/473 503/201 |
| 2009/0233548 A1 | 9/2009 | Andersson et al. | |
| 2011/0083712 A1* | 4/2011 | Ha | H01L 35/34 136/224 |
| 2011/0213595 A1 | 9/2011 | Ballmer | |
| 2012/0292309 A1 | 11/2012 | Fontaine | |
| 2014/0322408 A1 | 10/2014 | Khosla et al. | |
| 2016/0010901 A1* | 1/2016 | Osuman | H01L 35/30 355/30 |
| 2016/0239934 A1 | 8/2016 | Soborski | |
| 2016/0240762 A1 | 8/2016 | Carr | |
| 2017/0024485 A1 | 1/2017 | St. Martin et al. | |
| 2017/0049270 A1 | 2/2017 | Cohen | |
| 2017/0055499 A1 | 3/2017 | Peppou et al. | |
| 2017/0142984 A1 | 5/2017 | Schimitzek | |
| 2017/0159980 A1 | 6/2017 | Makansi et al. | |
| 2017/0193260 A1 | 7/2017 | Prusik et al. | |
| 2017/0221959 A1 | 8/2017 | Udrea et al. | |

FOREIGN PATENT DOCUMENTS

| | | |
|---|---|---|
| DE | 102005012678 A1 | 9/2006 |
| EP | 0075361 A1 | 3/1983 |
| EP | 0525897 A2 | 2/1993 |
| GB | 2155863 A | 10/1985 |
| WO | 2015185204 A1 | 12/2015 |

OTHER PUBLICATIONS

Pasquale A. Catalano et al., "Dynamic Thermoelectric Quick Response Code Branding", U.S. Appl. No. 15/801,728, filed Nov. 2, 2017.

"Operating Instruction for L&H Freeze Branders," L&H Branding Irons, http://lhbrandingirons.com/content/L-H%20Freeze%20Instructions.pdf, retrieved Nov. 1, 2017, 4 pages.

"Freeze Irons." Washington State Department of Agriculture, agr.wa.gov/FoodAnimal/Livestock/docs/Freeze%20Irons.pdf, Retrieved Nov. 1, 2017, 4 pages.

International Search Report and Written Opinion for PCT Application No. PCT/IB2018/058124, dated Feb. 15, 2019, pp. 1-8.

* cited by examiner

FIG. 7C they ferenced of the Peltier effect (or generally, the

DYNAMIC THERMOELECTRIC IMAGE BRANDING

BACKGROUND

The present invention relates to image branding, and more specifically, to dynamic thermoelectric image branding.

Thermoelectric devices are small heat pumps with solid state electrical components, known as thermoelectric elements, which leverage the Peltier effect (or generally, the thermoelectric effect) to create a temperature difference between the junctions of two different types of materials. The direction of the heat flux depends on the direction of a current applied to the thermoelectric elements. Conventional thermoelectric devices include two surfaces separated by at least one pair of thermoelectric elements. These pairs typically include a P-type semiconductor element and an N-type semiconductor element. The P-type and N-type thermoelectric elements are arranged in arrays that alternate between P-type and N-type elements in both array directions. Thermoelectric elements are available today in very small packages and can reach very high temperatures. For example, thermoelectric modules can be smaller than 2.5 mm×2.5 mm×2.5 mm and can reach temperatures of about 200 degrees Celsius.

Prior applications of thermoelectric devices include branding of quick response codes, for example. A quick response code is typically made up of black and white modules or dots that are arranged in a rectangular pattern. Each dot represents a bit of data ("0" or "1") based on being "black" or "white." Typical quick response codes use one or more of four standardized modes (numeric, alphanumeric, binary, and kanji) to store information about the item on which they are applied. The branding of quick response codes using thermoelectric devices facilitates application of the quick response codes to a wider variety of materials (e.g., food, animal products, animal branding, wood, leather) than was possible with prior methods such as printing, stamping, etching, or engraving. Conventional quick response codes are detected as a 2-dimensional digital image and can be digitally analyzed by a programmed processor. In the branding of quick response codes, minimization of thermal bleeding provides greater definition of each dot or bit. Specifically, sharp edges can facilitate accurate analysis and interpretation of the bits represented by the quick response codes. However, in other applications, greater realism may be desirable.

SUMMARY

Embodiments of the present invention are directed to a method, computer program product, and image branding system to brand an image on a product. The system includes an image controller to determine current values for application to one or more thermoelectric devices. The image controller also determines a current range within which to select the current values based on a material composition of the product. The system also includes an image branding device including the thermoelectric devices. Each of the thermoelectric devices have a corresponding contact surface representing a single pixel. The contact surface of each of the one or more thermoelectric devices is heated based on the respective current value applied.

BRIEF DESCRIPTION OF THE DRAWINGS

FIGS. 7A, 7B, and 7C each depict a possible searing arrangement of thermoelectric devices according to one or more embodiments of the invention;

Figure 1:
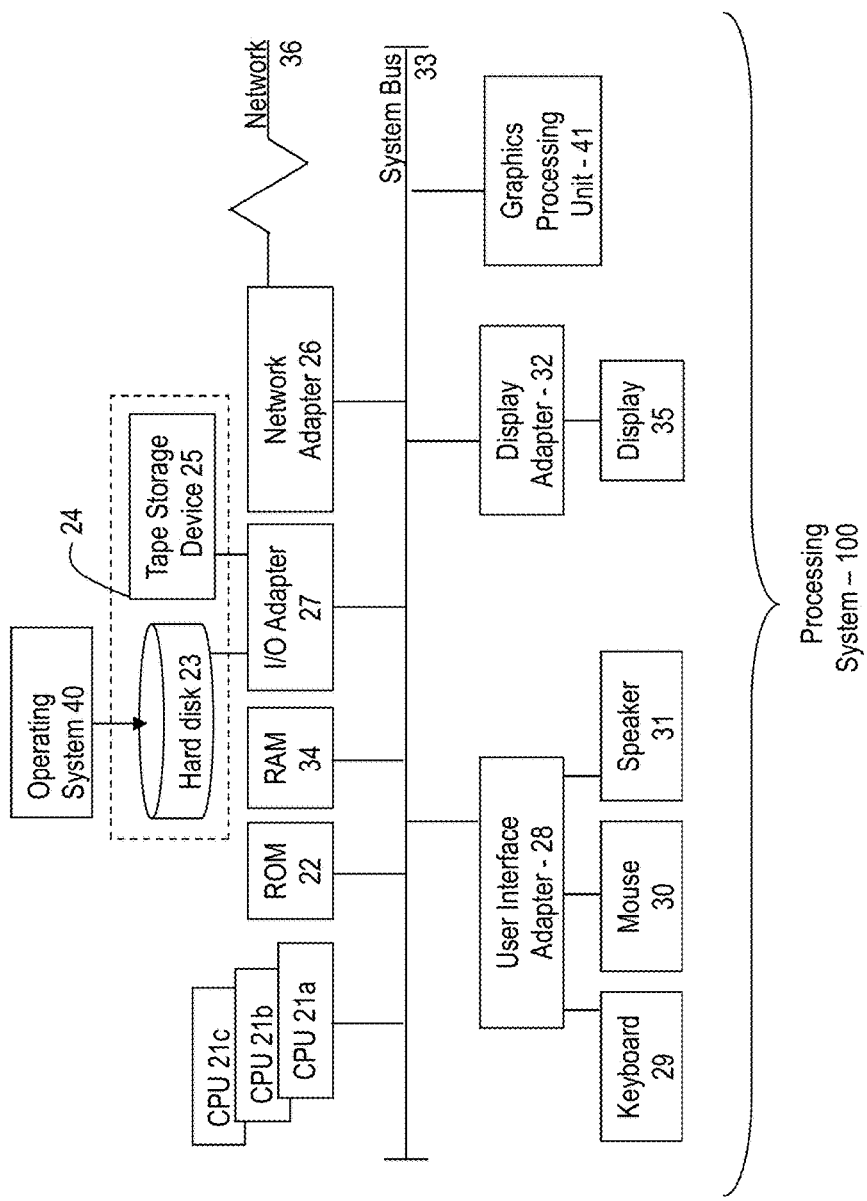
FIG. 1 depicts a block diagram of a computer system for use in implementing one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

The present invention will now be described with reference to the drawings, wherein like reference numerals are used to refer to like elements throughout. It should be understood that the description of these aspects are merely illustrative and that they should not be taken in a limiting sense. In the following description, for purposes of explanation, numerous specific details are set forth in order to provide a thorough understanding of the present invention. It will be evident to one skilled in the art, however, that the present invention can be practiced without these specific details.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Embodiments of the present invention enable the application of an image onto surfaces such as food, animal products, animal branding, leather, and wood using a contamination-free process with long-term durability. The image branding device can be adapted for use in factory machinery, implemented into a handheld branding iron, and used in the assembly line automation of food products. For example, a hamburger or bun could contain a seared quick response code that is scanned or, generally, any image to let a worker know what toppings to add to the specific customer's burger, or to automatically place said toppings. Images on food products can be used to advertise or provide information directly to consumers. For example, a quick response code branded onto a pancake could be scanned by a customer to see if the customer won a coupon for their next visit. A quick response code on a steak could be scanned to provide sourcing information such as the location and other details of the cow the meat came from. In another example, livestock branding (both searing and freezing) can be used as proof of ownership over livestock and is recognized by law in many western US states. By searing quick response codes onto livestock, ownership and other useful information can be easily discovered. This quick response code could be configured to launch a URL data type that logs the scanner's GPS location and notifies the owner as to the animal's current location. In yet another example, while branding is common on wood and leather products, the embodiments detailed herein relate to systems and methods that facilitate dynamic selection of the image to be branded and the material to be branded with the image.

According to the embodiments detailed herein, any image may be branded on any material based on dynamically determining the requisite current ranges necessary to impart a greyscale image on the material. Thermal bleeding can be used to facilitate smoother edges on the pixels according to exemplary embodiments. In addition to current values applied to the thermoelectric elements, duration of application of the thermoelectric device to the material can be controlled, according to exemplary embodiments, to affect the branded image.

Referring to FIG. 1, there is shown an embodiment of a processing system 100 for implementing the teachings herein. In this embodiment, the system 100 has one or more central processing units (processors) 21a, 21b, 21c, etc. (collectively or generically referred to as processor(s) 21). In one or more embodiments, each processor 21 can include a reduced instruction set computer (RISC) microprocessor. Processors 21 are coupled to system memory 34 and various other components via a system bus 33. Read-only memory (ROM) 22 is coupled to the system bus 33 and can include a basic input/output system (BIOS), which controls certain basic functions of system 100.

FIG. 1 further depicts an input/output (I/O) adapter 27 and a network adapter 26 coupled to the system bus 33. I/O adapter 27 can be a small computer system interface (SCSI) adapter that communicates with a hard disk 23 and/or tape storage device 25 or any other similar component. I/O adapter 27, hard disk 23, and tape storage device 25 are collectively referred to herein as mass storage 24. Operating system 40 for execution on the processing system 100 can be stored in mass storage 24. A network adapter 26 interconnects bus 33 with an outside network 36 enabling data processing system 100 to communicate with other such systems. A screen (e.g., a display monitor) 35 is connected to system bus 33 by display adaptor 32, which can include a graphics adapter to improve the performance of graphics intensive applications and a video controller. In one embodiment, adapters 27, 26, and 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which can include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 21, storage capability including the system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 1.

Figure 2:
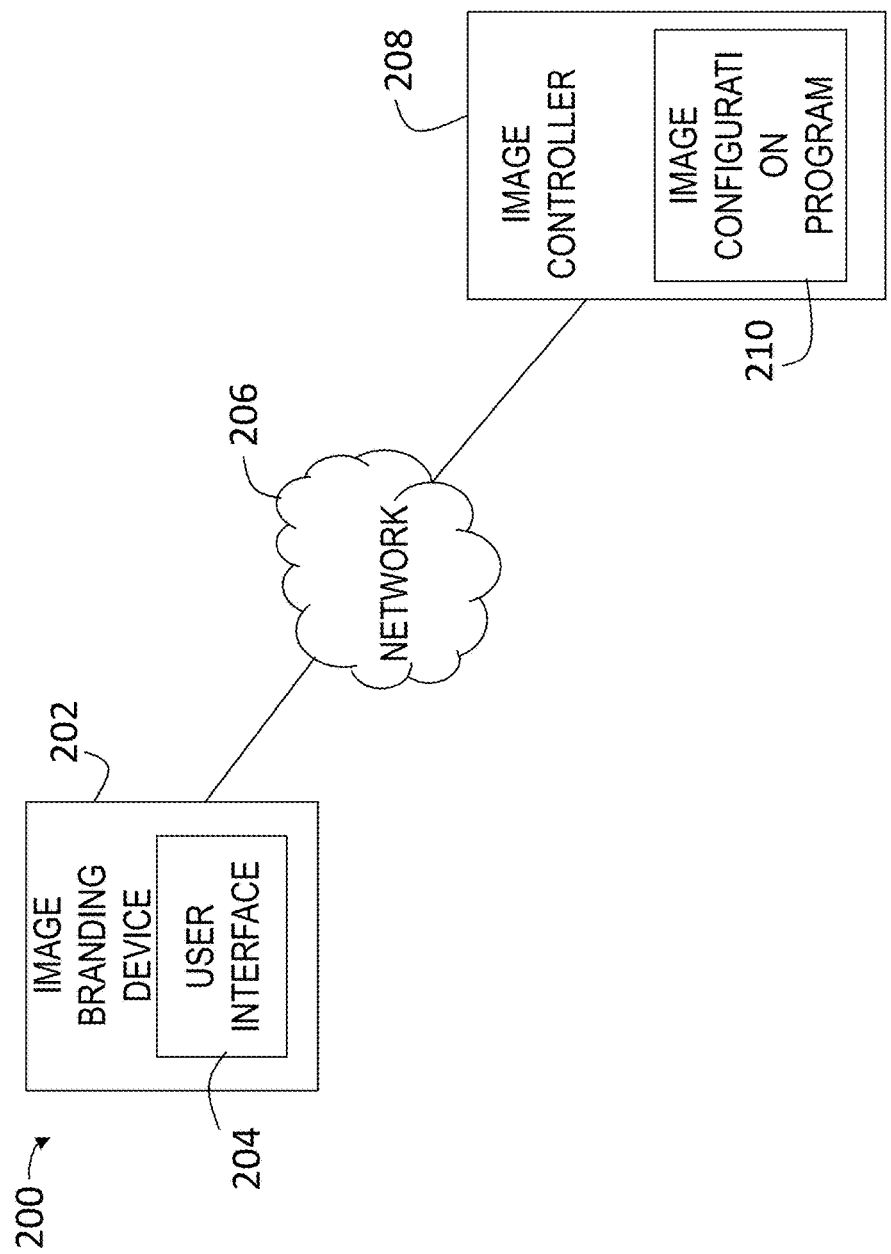
FIG. 2 depicts a block diagram of a system for applying quick response codes to a wide variety of surfaces using dynamic thermoelectric branding according to one or more embodiments of the present invention.

Turning now to a more detailed description of aspects of the present invention, FIG. 2 depicts a system 200 for applying an image to a wide variety of surfaces using dynamic thermoelectric branding according to one or more embodiments of the present invention. The system 200 includes an image branding device 202, a user interface 204, a network 206, an image controller 208, and an image configuration program 210. In one or more embodiments of the invention, the image branding device 202, image controller 208, user interface 204, network 206, and/or image configuration program 210 can be implemented on the processing system 100 found in FIG. 1.

As further discussed below, the image branding device 202 includes a matrix 302 of thermoelectric devices 304 (depicted in FIG. 3) for branding images. The image branding device 202 can be a handheld device, or can be adapted for automatic machine use (e.g., factory equipment). The image branding device 202 can be programmed to generate a desired image using the user interface 204. The user interface 204 can be separate from, or integrated into, the image branding device 202. The user interface 204 provides an interface to the image reconfiguration program 210 on the image controller 208 for a user of the image branding device 202. In some embodiments of the present invention, user interface 204 can be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program.

In another embodiment of the present invention, the user interface 204 can be mobile application software that provides an interface between a user of the image branding device 202 and the image controller 208. Mobile application software, or an "app," is a computer program designed to run on smartphones, tablet computers, and other mobile devices. User interface 204 enables the user of an image branding device 202 to register with the image controller 208 to adjust preferences for image branding protocols, such as the temperature, duration, and configuration of the thermoelectric devices 304 (depicted in FIG. 3). However, user interface 204 is not limited to the aforementioned examples and can be used to control any parameters associated with the image configuration program 210.

In yet another embodiment, the image controller 208 can include an instance of the user interface 204. For example, using the user interface 204, a user can input branding parameters based on various categories such as the type of substrate being branded, the minimum darkness of the branded material, and a desired image or quick response code pattern. In some embodiments of the present invention, a user can input raw text or numeric data into the user interface 204 for encoding into a quick response pattern by the image configuration program 210.

The image branding device 202 leverages the Peltier effect to heat or cool individual pixels (the thermoelectric devices 304 depicted in FIG. 3) to encode a unique image. To that end, the image controller 208 includes an image configuration program 210 for determining the necessary current inputs to each of the thermoelectric devices 304. According to exemplary embodiments of the present invention, the image configuration program 210 sends configuration parameters, including individual current inputs for each of the thermoelectric devices 304, to the image branding device 202 to configure the image branding device 202 for a particular branding application. The required current to heat or cool each of the thermoelectric devices 304 varies in part depending on the size and material of the thermoelectric devices 304, as well as on the material being branded. In some embodiments of the present invention, the required power for heating or cooling each of the thermoelectric devices 304 is about 0.21 milliwatts at 0.1 Volts and 0.21 Amps, although other power requirements are within the contemplated scope of the invention.

Figures 7A, 7B, 7C:
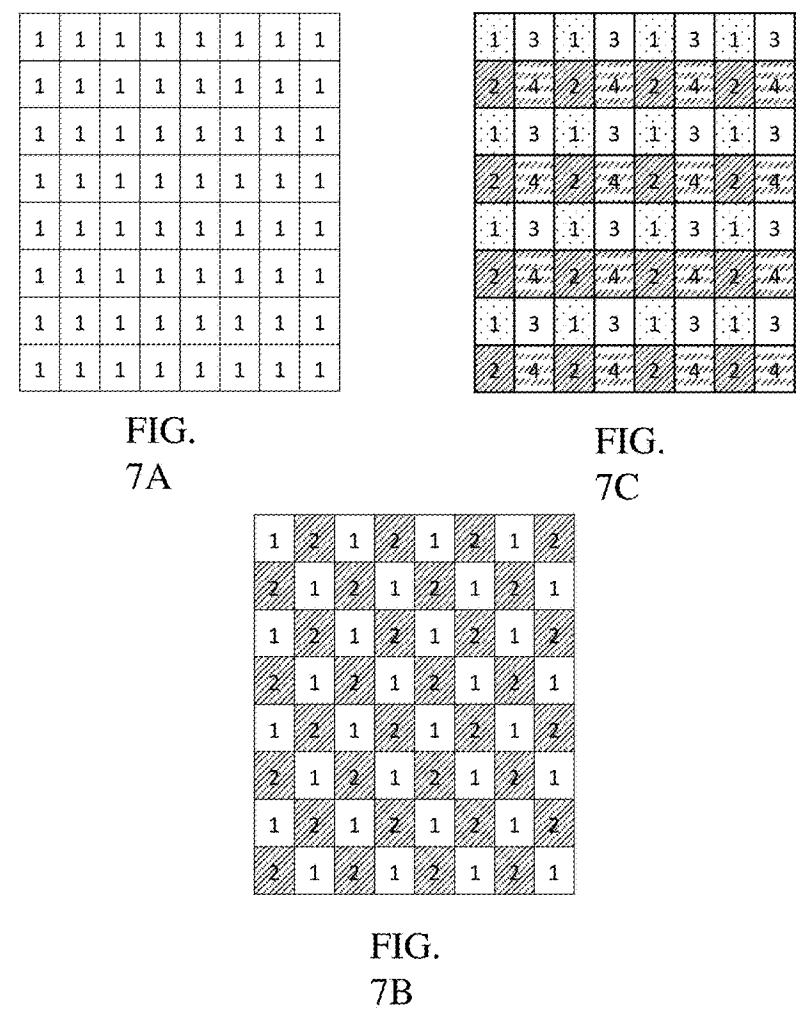

The configuration parameters determined by the image configuration program 210 can include any combination of variables required to brand a linear barcode, a matrix barcode, or any other image onto a product using the Peltier effect to individually heat or cool the thermoelectric devices 304. Variables can include a subset of the thermoelectric devices 304 that will be heated or cooled to generate the desired image, a list of sequential subsets of the thermoelectric devices 304 that will be consecutively heated or cooled to generate the desired image (as depicted in FIGS. 7B and 7C), the identification of a product type being branded, a desired darkness or lightness of the branded quick response code, and a length of branding time. It is understood however; that these variables are not limited to the embodiments disclosed herein and can be any variables associated with image branding techniques. The product (also known as a branding surface or substrate) can be any material that can be branded. A product can be, for example, cloth, leather, metal, wood, fur, plastic, animal hide, plant material, food products, or any combination of the listed substrates. However, the substrates are not limited to the materials listed herein. In some embodiments of the present invention, the image configuration program 210 generates configuration parameters to heat a first subset of the thermoelectric devices 304. In some embodiments of the present invention, the quick response configuration program 210 generates configuration parameters to heat a first subset of the thermoelectric devices 304 and cool a second subset of the thermoelectric devices 304.

The image configuration program 210 determines one or more executable program instructions to generate the one or more configuration parameters required at the image branding device 202. In some embodiments of the present invention, the image configuration program 210 translates a received image pattern into one or more configuration parameters including machine readable instructions by identifying the subset of thermoelectric devices 304 which need to be heated and/or cooled to generate the desired pattern. The image configuration program 210 then communicates the list of currents for the thermoelectric devices 304 as one or more executable program instructions to the image controller 208.

The image controller 208 sends the one or more executable program instructions generated by the image configuration program 210 to the image branding device 202. In one embodiment, the image configuration program 210 can send executable program instructions via the network 206. For example, a user can input configuration parameters into a laptop computer containing the image configuration program 210 which will subsequently send the executable program instructions associated with the input configuration parameters over network 206 to the image branding device 202. For example, the image configuration program 210 can send program instructions to run a specific current through each of the thermoelectric devices 304 depending on the desired image pattern. The specific current for a given thermoelectric device can be adjusted based on the previous state of that device. For example, the image configuration program 210 can designate a first "cooling" current for a first device and a second, lower "cooling" current for a second device to account for the fact that the first device is hot (e.g., the device was heated in the previous stage of a multistate branding application) while the second device is already cool (e.g., the device was not heated or was cooled in the previous stage of a multistate branding application).

The image branding device 202, user interface 204, image controller 208, and image configuration program 210 can be interconnected over the network 206. The network 206 can be, for example, a telecommunications network, a local area network (LAN), a wide area network (WAN), such as the Internet, or a combination of the three, and can include wired, wireless, or fiber optic connections. The network 206 can include one or more wired and/or wireless networks that are capable of receiving and transmitting data, voice, and/or video signals, including multimedia signals that include voice, data, and video information. In general, network 206 can be any combination of connections and protocols that will support communications between the image branding device 202 and the image controller 208, and other computing devices (not shown) within the system 200.

Figure 3:
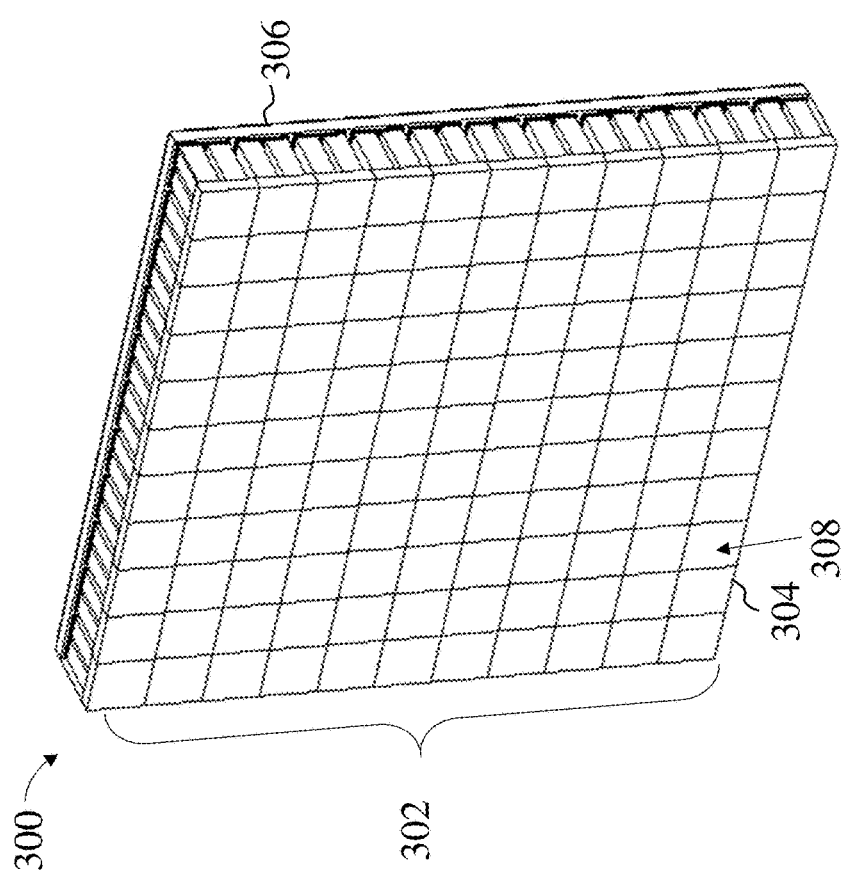
FIG. 3 depicts a first view of a quick response branding device searing head formed according to one or more embodiments of the invention.

FIG. 3 depicts a first view of an image branding device searing head 300 according to one or more embodiments of the invention. In some embodiments of the present invention, the searing head 300 is coupled to the image branding device 202. As depicted, the searing head 300 includes a matrix 302 of thermoelectric devices 304 arranged on a substrate 306 for generating an 11 by 11 module pattern. It is understood, however, that the thermoelectric devices 304 can be arranged into any version of a linear or matrix barcode (QR Version 1 to Version 40, IQR, micro QR code, etc.) or another shape. Alternatively, the thermoelectric devices 304 can be arranged into a high-resolution grid having any desired number of "pixels" (e.g., for image resolutions of 1280×720, 1920×1080, 3840×2160, etc.) for generating an image.

As discussed previously herein, the image branding device 202 leverages the Peltier effect whereby the direction and magnitude of current flow for each of the thermoelectric devices 304 can be adjusted individually to heat or cool each of the thermoelectric devices 304. In some embodiments of the present invention, one of a pair of binary sear/no sear currents is sent to each of the thermoelectric devices 304. In other words, "dark" pixels in the image can be seared while "light" pixels are not seared. Alternatively, non-binary degrees of "shading" (i.e., gradient shading) can be provided in an image or pattern by adjusting the relative magnitude of current flow for each of the thermoelectric devices 304. For example, increasing the current flow to a thermoelectric device will increase the device's surface searing temperature, resulting in a relatively darker sear in the corresponding pixel. Similarly, decreasing the current flow to a device will decrease the device's surface searing temperature, resulting in a lighter sear in the corresponding pixel. In some embodiments of the present invention, a continuous spectrum of shading can be provided to generate greyscale images using the thermoelectric devices 304.

In some embodiments of the present invention, the thermoelectric devices 304 each include a rectangular or square contact surface 308, although other surface geometries, such as circular, elliptical, superelliptical, and polygonal, are within the contemplated scope of the invention. The contact surface 308 can be formed using any suitable material for branding, such as, for example, ceramics, plastics, or any dielectric material exhibiting a high thermal conductivity. Ceramics, for example, are electrical insulators that provide adequate to good thermal conductivity. Accordingly, ceramics are well-suited as thermoelectric substrates. In some embodiments of the present invention, the contact surface 308 includes a metal. Metal substrates, however, require a relatively thin insulating layer (not depicted) located between the contact surface 308 and the thermoelectric elements 502 (depicted in FIG. 5) and the first interconnect layer 504 (depicted in FIG. 5) that electrically couples pairs of thermoelectric elements 502. In some embodiments of the present invention, the contact surface 308 is plated using, for example, nickel (Ni), to provide a surface that is more easily cleaned. In some embodiments of the present invention, the thermoelectric devices 304 are potted in thermally and/or electrically insulating material, such as an epoxy or an acrylic, to fill (sometimes referred to as underfill) the space between the contact surfaces 308 without covering the surface of the contact surfaces 308.

The substrate 306 can be formed using any suitable material, such as, for example, a dielectric material. In some embodiments of the present invention, the substrate 306 is made of a same material as the contact surface 308. In some embodiments of the present invention, the substrate 306 is made of a dielectric having a poor thermal conductivity, such as for example, a plastic.

The thermoelectric devices 304 can be sized to accommodate any desired pattern size. In some embodiments of the present invention, each of the thermoelectric devices 304 includes a length of about 1.15 mm and a height of about 1.15 mm, although other dimensions are within the contemplated scope of the invention. In some embodiments of the present invention, the matrix 302 of thermoelectric devices 304 includes a pattern size of about 12 mm by 12 mm, although other dimensions are within the contemplated scope of the invention. Each of the thermoelectric devices 304 can be separated by a pitch distance. In some embodiments of the present invention, the centerline-to-centerline pitch distance is about 1.27 mm, although other pitch distances are within the contemplated scope of the invention. Moreover, as depicted, the matrix 302 includes thermoelectric devices 304 having a same or substantially same size (length, width, and depth). In some embodiments of the present invention, the matrix 302 includes thermoelectric devices 304 having two or more unique dimensions. In some embodiments of the present invention, each of the thermoelectric devices 304 includes a unique dimension.

Figure 4:
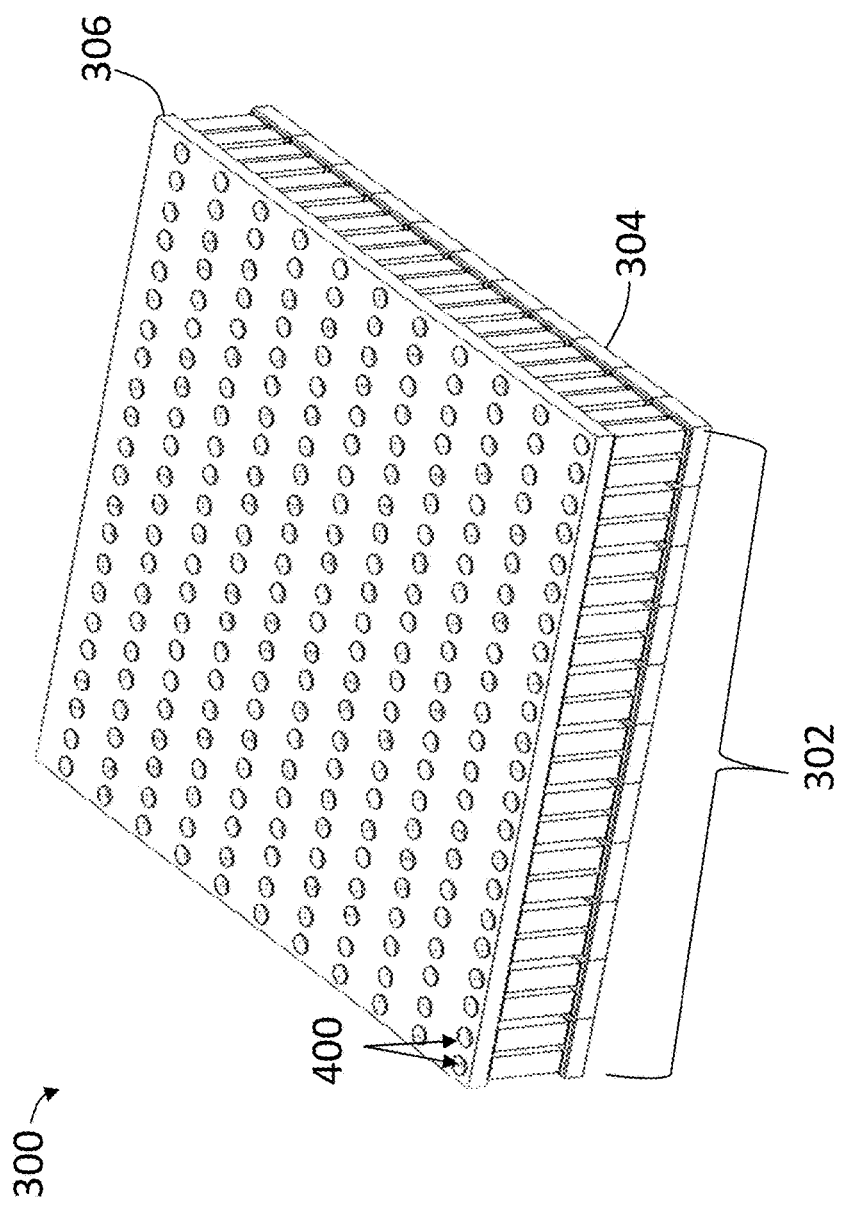
FIG. 4 depicts a second view of the quick response branding device searing head illustrated in FIG. 3 according to one or more embodiments of the invention.

FIG. 4 depicts a second view of the image branding device searing head 300 according to one or more embodiments of the invention. As described previously herein, the searing head 300 includes a matrix 302 of thermoelectric devices 304 arranged on a substrate 306 for generating an 11 by 11 module pattern. As depicted, each of the thermoelectric devices 304 includes a pair of electrodes 400 formed on a surface of the substrate 306. Each pair of electrodes 400 electrically couples one of the thermoelectric devices 304 to the image branding device 202. While each of the thermoelectric devices 304 is depicted as having a pair of electrodes 400, other electrode configurations are within the contemplated scope of the invention. For example, each of the thermoelectric devices 304 can be electrically coupled to a single electrode pair or to two or more electrode pairs.

Figure 5:
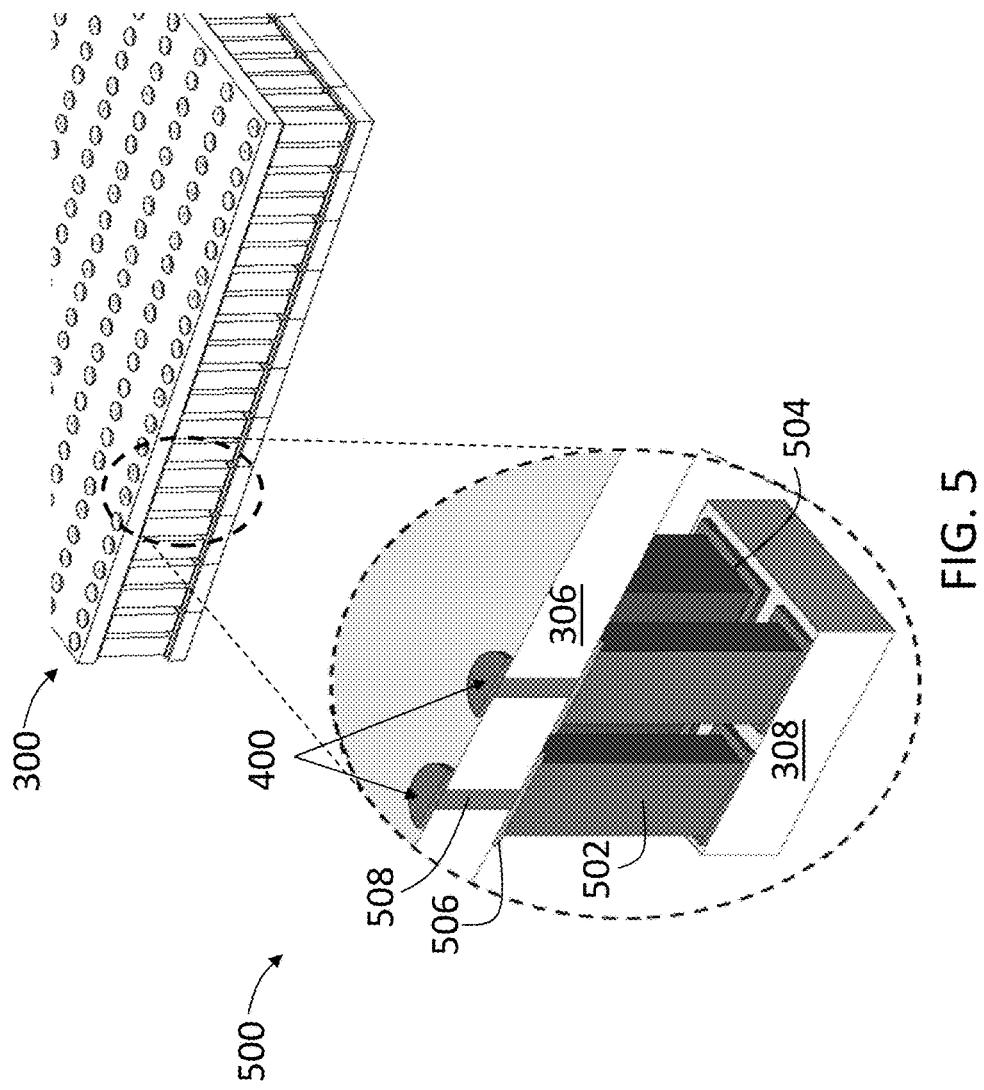
FIG. 5 depicts an expanded view of a single thermoelectric device formed according to one or more embodiments of the invention.

FIG. 5 depicts an expanded view of a single thermoelectric device 500 of the thermoelectric devices 304 according to one or more embodiments of the invention. The thermoelectric device 500 includes two or more thermoelectric elements 502. A first end of each of the thermoelectric elements 502 is coupled to the contact surface 308 using a first interconnect layer 504. A second end of each of the thermoelectric elements 502 is coupled to the substrate 306 using a second interconnect layer 506. The second interconnect layer 506 is electrically coupled to the pair of electrodes 400 using vias 508 formed in the substrate 306. In this manner, current can be transferred from a source in the image branding device 202 to the thermoelectric elements 502 through the vias 508.

The thermoelectric elements 502 can be made using any suitable thermoelectric material, such as, for example, n-type and p-type doped semiconductor material. The semiconductor material can be, for example, monocrystalline silicon (Si), silicon-germanium (SiGe), silicon carbide (SiC), III-V compound semiconductor, II-VI compound semiconductor, or any semiconductor material exhibiting a combination of high Seebeck coefficient, high electrical conductivity, and low thermal conductivity, such as, for example, bismuth telluride ($Bi_2Te_3$). The semiconductor material can be doped using n-type dopants (e.g., phosphorus (P) or arsenic (As)) or p-type dopants (e.g., boron (B) or gallium (Ga)). As depicted, the thermoelectric device 500 includes four thermoelectric elements 502. In some embodiments of the present invention, the thermoelectric elements 502 are arranged into electrically coupled pairs of n-type and p-type semiconductors. In other words, each electrode 400 is electrically coupled to a single pair of one p-type thermoelectric element and one n-type thermoelectric element. In some embodiments of the present invention, the pairs of a single p-type thermoelectric element and a single n-type thermoelectric element are themselves stacked such that adjacent (above, below, or to the side) thermoelectric elements have an opposite doping type while diagonal thermoelectric elements have a same doping type.

The first and second interconnect layers 504 and 506, the vias 508, and the electrodes 400 can be made of any suitable conducting material, such as, for example, a metal (e.g., tungsten (W), titanium (Ti), tantalum (Ta), ruthenium (Ru), zirconium (Zr), cobalt (Co), copper (Cu), aluminum (Al), lead (Pb), platinum (Pt), tin (Sn), silver (Ag), gold (Au)), a conducting metallic compound material (e.g., tantalum nitride (TaN), titanium nitride (TiN), tantalum carbide (TaCx), titanium carbide (TiC), titanium aluminum carbide ($Ti_3AlC_2$), tungsten silicide ($WSi_2$), tungsten nitride ($WN_2$), ruthenium oxide ($RuO_2$), cobalt silicide ($CoSi_2$), nickel silicide (NiSi)), carbon nanotube, conductive carbon, graphene, or any suitable combination of these materials. Moreover, the interconnect layers 504 and 506, the vias 508, and the electrodes 400 can each include a same or different conducting material.

Figure 6:
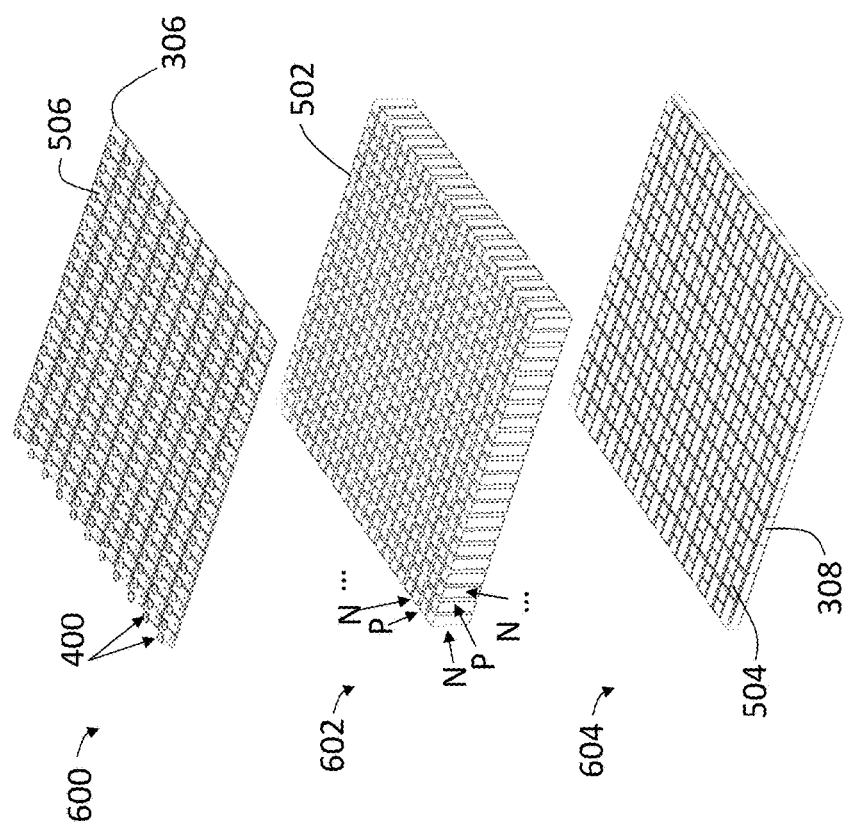
FIG. 6 depicts a blown-out view of a quick response branding device searing head according to one or more embodiments of the invention.

FIG. 6 depicts a blown-out view of the image branding device searing head 300 according to one or more embodiments of the invention. As depicted, the searing head 300 includes a top layer 600, a thermoelectric layer 602, and a bottom layer 604. From this view, the electrical connections between the components of the searing head 300 are more easily apparent. For example, a single electrode 400 is electrically coupled to a pair of oppositely doped thermoelectric elements 502 using the second interconnect layer 506. The thermoelectric layer 602 includes the thermoelectric elements 502 of the searing head 300. As depicted, the thermoelectric elements 502 alternate in doping type along a first direction and a second direction.

FIGS. 7A, 7B, and 7C each depict a possible searing arrangement of thermoelectric devices 304 according to one or more embodiments of the invention. As discussed previously herein, the thermoelectric devices 304 are individually heated or cooled. In some embodiments of the present invention, a desired image pattern is generating using a 1-stage searing process, as depicted in FIG. 7A. In a 1-stage process, the thermoelectric devices 304 are simultaneously heated or cooled depending on whether each "pixel" is shaded in the image.

Alternatively, a single image pattern could be seared over multiple rounds. During each round, only a subset of the thermoelectric devices 304 are heated or cooled. Advantageously, the subsets of thermoelectric devices 304 can be staggered such that each of the thermoelectric devices 304 being heated during a particular searing round is surrounded by thermoelectric devices 304 which are either "off" or cooling. In this manner, thermal bleeding is controlled and a greater image definition is possible. As previously noted, thermal bleeding may be desirable when blending, rather than definition, is warranted by the image.

FIG. 7B depicts a 2-stage searing process. During the first stage, the active thermoelectric devices 304 in the first stage (labeled "1") are heated if they are shaded and cooled if they are unshaded in the image pattern. While some of the thermoelectric devices 304 in the first stage are heated, all of the thermoelectric devices 304 in the second stage (labeled "2") are cooled. During the second stage, the reverse occurs, with a subset of the active thermoelectric devices 304 in the second stage being heated while all of the thermoelectric devices 304 in the first stage are cooled. In this manner, thermoelectric devices 304 adjacent to each other on the left, right, top, and bottom would never be heated simultaneously.

FIG. 7C depicts a 4-stage searing process. The 4-stage process is similar to the 2-stage process, except that during a single stage all three other stages are inactive or cooled. For example, during the first stage, the active thermoelectric devices 304 in the first stage (labeled "1") are heated if they are shaded and cooled if they are unshaded in the image. While some of the thermoelectric devices 304 in the first stage are heated, all of the thermoelectric devices 304 in the second stage (labeled "2"), the third stage (labeled "3"), and fourth stage (labeled "4") are cooled. Stage two, three, and four would then be cycled through in a similar fashion. In this manner, thermoelectric devices 304 would never be heated simultaneously with any adjacent thermoelectric device 304 (i.e., to the left, right, top, bottom, and diagonals).

FIGS. 8A, 8B, 8C, and 8D each depict a possible contact surface 308 shape for a thermoelectric device 304 according to one or more embodiments of the invention. As discussed previously herein, the thermoelectric devices 304 can include a rectangular, square, circular, elliptical, superelliptical, and polygonal shape. The shape of the contact surface 308 can be modified depending on the requirements of a particular application (image pattern size, substrate type, environmental conditions, etc.). Depending on the particular application, the shape of the contact surface 308 can be selected to minimize any expected blurring effects or to facilitate blending. For example, some amount of blurring is expected when attempting to sear a perfect square onto a food product. The amount of blurring may or may not be sufficient to prevent a quick response code from being read. Some contact surface shapes are more susceptible to blurring effects or, seen another way, more conducive to blending than others. In some embodiments of the present invention, the contact surfaces 308 are shaped in such a way that potential thermal bleeding will not affect the readability of neighboring quick response "bits" to ensure that the result accurately reflects the desired quick response code. In alternate embodiments, the contact surfaces 308 are shaped to facilitate anti-aliasing.

Figure 8A:
FIGS. 8A-8D each depict a possible contact surface shape for a thermoelectric device according to one or more embodiments of the invention.
Figure 8B:
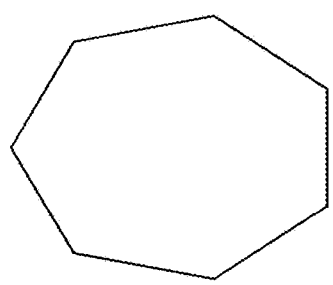
Figure 8C:
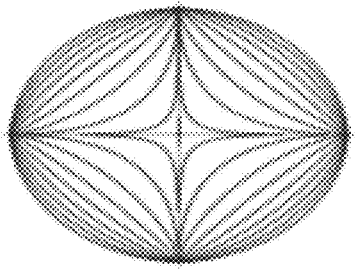
Figure 8D:
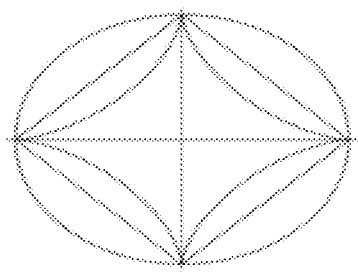

FIG. 8A depicts a rectangular or square shape. Rectangular shapes are well-suited to applications having minimal blurring, although it is understood that a rectangular shape can be used in any application. Advantageously, rectangular shapes are somewhat easier and less costly to manufacture than more complicated shapes. FIG. 8B depicts a polygonal shape, in particular, a heptagonal shape. It is understood, however, that other polygonal shapes are within the contemplated scope of the invention. FIGS. 8C and 8D each depict a superimposed set of superellipses.

Figure 9C:
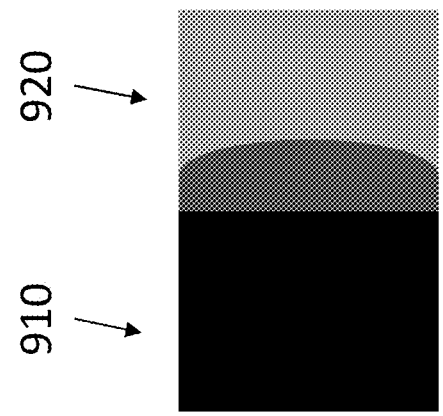
FIGS. 9A, 9B, and 9C each depict a different degree of anti-aliasing achieved with the thermoelectric devices according to one or more embodiments of the invention.
Figure 9B:
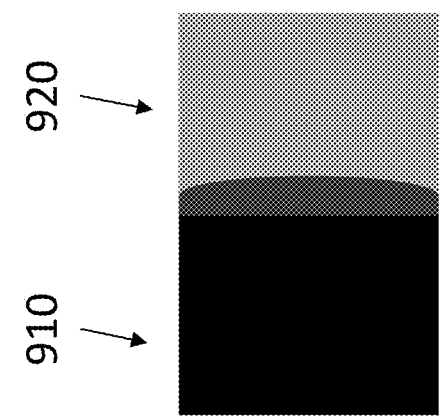
Figure 9A:
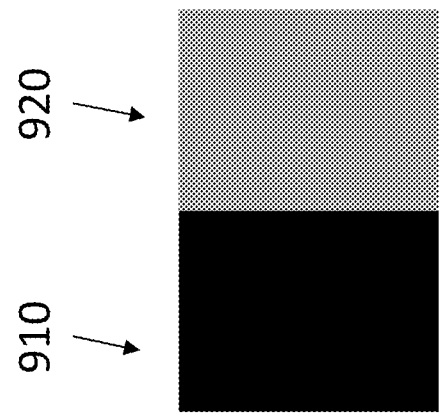

FIGS. 9A, 9B, and 9C depict varying degrees of anti-aliasing achieved with the thermoelectric devices 304 according to one or more embodiments of the invention. Each of the figures shows two adjacent pixels 910, 920 obtained by using square contact surfaces 308 on the corresponding thermoelectric devices 304. FIG. 9A depicts an embodiment with minimal thermal bleeding. This result can be achieved by heating the contact surface 308 associated with the pixel 910 for a given duration while cooling the contact surface 308 associated with the pixel 920 for that entire duration. FIG. 9B shows a result with anti-aliasing. The contact surface 308 associated with the pixel 910 is heated for a given duration again, while the contact surface 308 associated with pixel 920 is only cooled for 80 percent of that duration. FIG. 9C shows pixels 910, 920 resulting from anti-aliasing, as well. As a comparison of FIGS. 9B and 9C indicates, the thermal bleeding achieved in FIG. 9C is greater than that achieved in FIG. 9B. The contact surface 308 associated with the pixel 910 is heated for a given duration again, while the contact surface 308 associated with pixel 920 is only cooled for 50 percent of that duration to give the result in FIG. 9C.

Figure 10A:
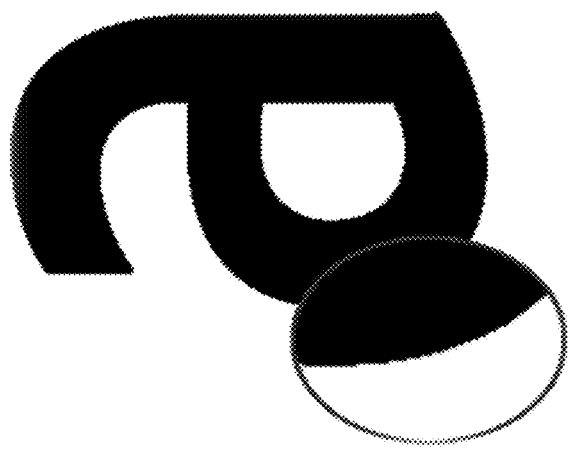
FIGS. 10A and 10B each depict an image obtained with a different anti-aliasing result using the thermoelectric devices according to embodiments of the invention.
Figure 10B:
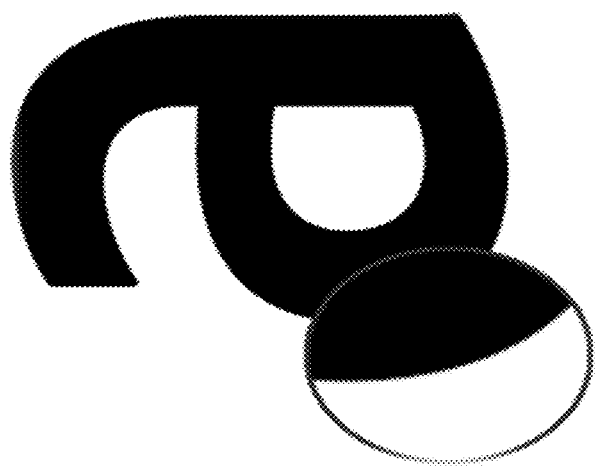

FIGS. 10A and 10B depict an image obtained with different anti-aliasing results using the thermoelectric devices 304 according to embodiments of the invention. As FIGS. 10A and 10B indicate, the image is the letter "a" in each case. In FIG. 10A, the edges depicted in the zoomed-in portion appear jagged. This indicates that thermal bleeding was avoided and the edges of the contact surfaces 308 are clearly delineated. In FIG. 10B, the edges are smoothed and the anti-aliasing resulting from controlled thermal bleeding is evident in the zoomed-in portion. The smoothed edges in FIG. 10B result from controlling the current as well as the duration of heating and cooling for the thermoelectric devices 304 of the searing head 300.

Figure 11:
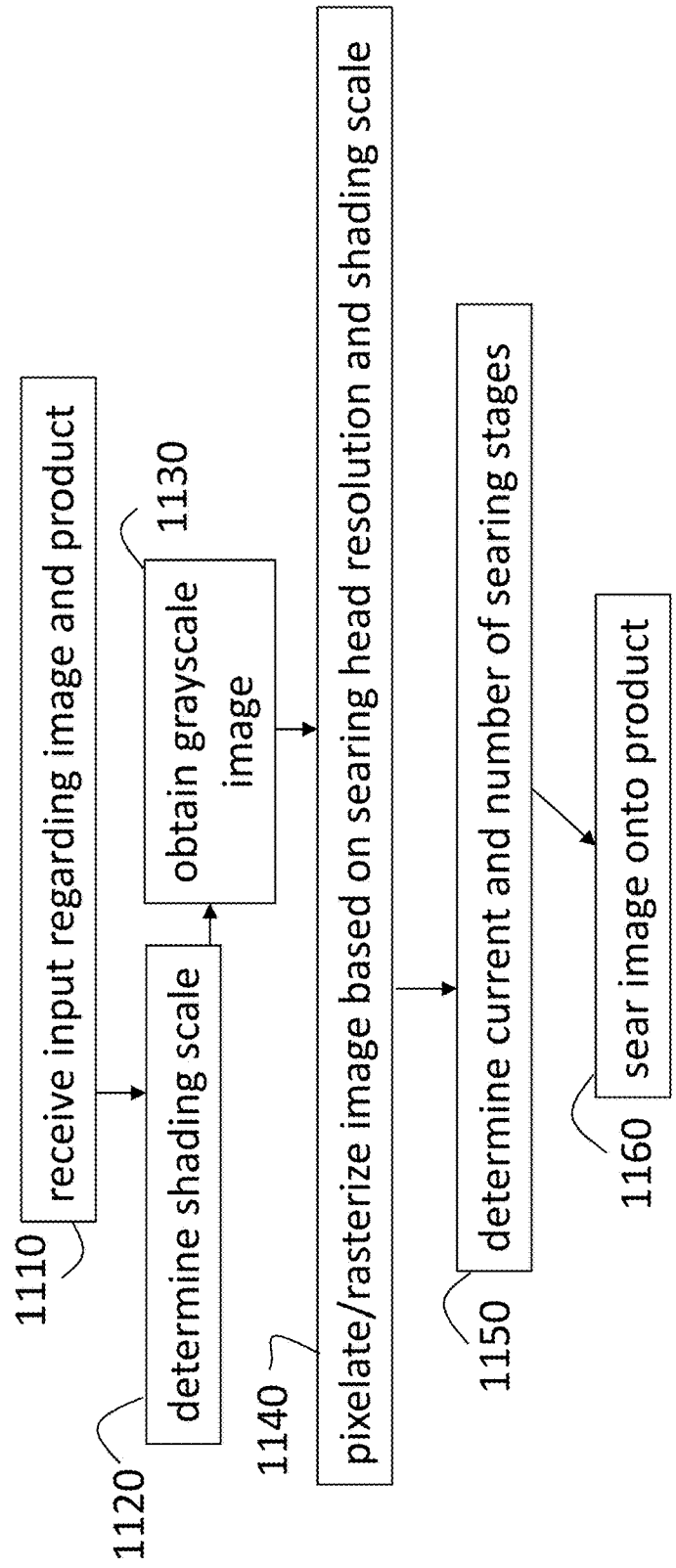
FIG. 11 is a process flow of a method of operating an image branding device according to one or more embodiments of the present invention.

FIG. 11 is a process flow of a method of operating an image branding device 202 according to one or more embodiments of the present invention. At block 1110, receiving input regarding an image and a product refers to the user interface 204 being used to indicate an image to be branded and a product on which to brand the image. The image may be scanned or uploaded, for example, and the image may be in color or grayscale. Determining a shading scale, at block 1120, refers to the image controller 208 and, more particularly, the image configuration program 210, determining a current range for the thermoelectric devices 304 based on the product. For example, a current between 0 and 5 Amperes may be sent to a thermoelectric element 502. Increments of the current are digital steps based on the number of bits used in a control register. For example, if an 8-bit register is used to control the current, 256 steps over 5 Amperes or a resolution of 0.02 Amperes per bit is possible. If, for example, the product is leather, it may be determined that only current between 3 and 4 Amperes, which correspond to 150 degrees Centigrade to 200 degrees Centigrade, causes gradient shading on the leather. This current range corresponds to a range between the 153 decimal and 205 decimal of the 8-bit register such that 52 different current levels are available as the shading scale in the exemplary case. The shading scale or at least the currents associated with gradient shading for different types of products may be pre-determined as part of a calibration process and stored, for example.

At block 1130, obtaining a grayscale image may mean retaining the image that was provided at block 1110, if that image was already grayscale. However, even if the image was received (at block 1110) as a grayscale image, it may need further conversion to fit within the shading scale determined at block 1120. If the image provided at block 1110 was color, then obtaining a grayscale image, at block 1130, refers to performing a conversion at the image controller 208. At block 1140, pixelating or rasterizing the image is based on the searing head 300 resolution and on the shading scale determined at block 1120. For example, the image branding device 202 may include 100-by-100 pixels and 52 current levels corresponding to 52 variations in grayscale. Based on the size of the image that is provided at block 1110 and the size of the image to be branded on the product, the pixilation can be based on moving the image branding device 202 two or more times to brand the entire image.

At block 1150, the current level for each thermoelectric device 304 and the number of searing stages is determined by the image configuration program 210. As previously noted, the current state of each thermoelectric device 304 of the image branding device 202 (e.g., a thermoelectric device 304 was heated or cooled in the previous stage) can affect the determination. Searing the image onto the product, at block 1160, refers to the image configuration program 210 providing instructions to the image branding device 202 over the network 206, for example, such that the instructions can be implemented and the product can be seared with the image.

Additional processes can also be included. It should be understood that the processes depicted in FIG. 11 represent illustrations and that other processes can be added or existing processes can be removed, modified, or rearranged without departing from the scope and spirit of the present disclosure.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Similarly, the term "coupled" and variations thereof describes having a communications path between two elements and does not imply a direct connection between the elements with no intervening elements/connections between them. All of these variations are considered a part of the specification. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of +12%, 8% or 5%, or 2% of a given value.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An image branding system to brand an image on a product, the system comprising:
    an image controller configured to determine current values for application to one or more thermoelectric devices, wherein the image controller is further configured to determine a current range within which to select the current values based on a material composition of the product; and
    an image branding device comprising the thermoelectric devices, each of the thermoelectric devices having a corresponding contact surface representing a single pixel, wherein the contact surface of each of the one or more thermoelectric devices is heated based on the respective current value applied.

2. The system according to claim 1, wherein each of the one or more thermoelectric devices includes an n-type thermoelectric element electrically coupled to a p-type thermoelectric element.

3. The system of claim 1, wherein each of the one or more thermoelectric devices comprises two or more pairs of thermoelectric elements, each pair of the thermoelectric elements including an n-type thermoelectric element electrically coupled to a p-type thermoelectric element.

4. The system of claim 3, wherein the contact surface corresponding to each of the one or more thermoelectric devices is coupled to an end of the n-type thermoelectric element and the p-type thermoelectric element.

5. The system of claim 3, wherein each of the thermoelectric elements is electrically coupled to an electrode.

6. The system according to claim 1, wherein the image controller is further configured to pixilate the image.

7. The system according to claim 6, wherein the image controller is configured to pixilate the image based on a number of the contact surfaces of the image branding device and a number of increments of current values available within the current range.

8. The system according to claim 1, wherein the image controller is further configured to determine a number of searing stages, wherein the respective current value is applied to a subset of the one or more thermoelectric devices in each of the searing stages.

9. A computer-implemented method of branding an image on a product, the method comprising:
    obtaining, using an image controller, the image and information regarding the product;
    determining, using the image controller, a current range based on a material composition of the product;
    determining, using the image controller, current values within the current range for application to one or more thermoelectric devices of an image branding device; and
    branding the image on the product based on applying the current values to the one or more thermoelectric devices.

10. The computer-implemented method according to claim 9, further comprising obtaining a grayscale image based on the image being a color image.

11. The computer-implemented method according to claim 9, further comprising pixilating the image.

12. The computer-implemented method according to claim 11, wherein the pixilating the image is based on a pixel resolution of the image branding device and the current range.

13. The computer-implemented method according to claim 9, further comprising determining a number of searing stages for the image branding device, wherein the respective current value is applied to a subset of the one or more thermoelectric devices in each of the searing stages.

14. The computer-implemented method according to claim 9, further comprising providing instructing from the image controller to the image branding device to brand the image on the product.

15. A computer program product for branding an image on a product, the computer program product comprising a computer readable storage medium having program instructions embodied therewith, the program instructions executable by a processor to perform a method comprising:
    obtaining the image and information regarding the product;
    determining a current range based on a material composition of the product; and
    determining current values within the current range for application to one or more thermoelectric devices of an image branding device, wherein the image is branded on the product based on the current values determined for application to the one or more thermoelectric devices.

16. The computer program product according to claim 15, further comprising obtaining a grayscale image based on the image being a color image.

17. The computer program product according to claim 15, further comprising pixilating the image.

18. The computer program product according to claim 17, wherein the pixilating the image is based on a pixel resolution of the image branding device and the current range.

19. The computer program product according to claim 15, further comprising determining a number of searing stages for the image branding device, wherein the respective current value is applied to a subset of the one or more thermoelectric devices in each of the searing stages.

20. The computer program product according to claim 15, further comprising providing instructions to the image branding device to brand the image on the product.

\* \* \* \* \*